United States Patent
Chen et al.

(10) Patent No.: US 9,524,553 B2
(45) Date of Patent: Dec. 20, 2016

(54) IMAGE PROCESSING APPARATUS, IMAGE PROCESSING METHOD, AND RECORDING MEDIUM

(71) Applicant: FUJITSU LIMITED, Kawasaki-shi, Kanagawa (JP)

(72) Inventors: Bin Chen, Machida (JP); Yoshihiko Murakawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/634,087

(22) Filed: Feb. 27, 2015

(65) Prior Publication Data

US 2015/0278636 A1 Oct. 1, 2015

(30) Foreign Application Priority Data

Mar. 31, 2014 (JP) ................. 2014-074846

(51) Int. Cl.
| | | |
|---|---|---|
| *G06K 9/46* | (2006.01) | |
| *G06T 7/00* | (2006.01) | |
| *G06K 9/32* | (2006.01) | |

(52) U.S. Cl.
CPC ............ *G06T 7/004* (2013.01); *G06K 9/3216* (2013.01); *G06K 9/3233* (2013.01); *G06T 7/0042* (2013.01); *G06K 2009/3225* (2013.01); *G06T 2207/10024* (2013.01); *G06T 2207/30204* (2013.01)

(58) Field of Classification Search
CPC ................ G06K 9/3216; G06K 9/3233; G06K 2009/3225
USPC ........................................... 382/195
See application file for complete search history.

(56) References Cited

U.S. PATENT DOCUMENTS

| | | | | |
|---|---|---|---|---|
| 7,970,576 B2* | 6/2011 | Satoh | ...................... | G01C 11/02 356/622 |
| 2010/0036792 A1 | 2/2010 | Sawada et al. | | |
| 2014/0111454 A1 | 4/2014 | Hosoi et al. | | |

FOREIGN PATENT DOCUMENTS

| | | |
|---|---|---|
| JP | 2009-017211 A | 1/2009 |
| JP | 2009-094799 A | 4/2009 |
| JP | 2010-020374 A | 1/2010 |
| JP | 2012-253736 A | 12/2012 |
| JP | 2013-101128 A | 5/2013 |

* cited by examiner

*Primary Examiner* — Ruiping Li
(74) *Attorney, Agent, or Firm* — Fujitsu Patent Center

(57) ABSTRACT

An image processing apparatus generates a hypothesis group for marker areas and marker identifiers by randomly scattering hypotheses including the marker areas and the marker identifiers in a range in which the hypotheses can be made, and evaluates each of the hypotheses for the marker areas and the marker identifiers using image information on markers, when a variance value of a marker area in a hypothesis including a marker identifier satisfying a predetermined condition is a predetermined threshold or larger, and replicates a hypothesis extracted from the hypothesis group, based on the evaluation result, and reconstructs the hypothesis group by changing the replicated hypothesis based on a degree of similarity between markers and on a neighborhood probability of a marker, and causes repetitive execution of the evaluating, the replicating, and the reconstructing until the variance value becomes smaller than the threshold in the reconstructed hypothesis group.

6 Claims, 11 Drawing Sheets

FIG.13

|  | ALL | IN-HOUSE | INVOLVED PARTIES | PERSONAL |
|---|---|---|---|---|
| PUBLIC | ○ | × | × | × |
| RECEPTION | ○ | × | × | × |
| IN-HOUSE | ○ | ○ | × | × |
| MEETING ROOM | ○ | ○ | ○ | × |
| DESK | ○ | ○ | ○ | ○ |

IMAGE PROCESSING APPARATUS, IMAGE PROCESSING METHOD, AND RECORDING MEDIUM

CROSS-REFERENCE TO RELATED APPLICATION

This application is based upon and claims the benefit of priority of the prior Japanese Patent Application No. 2014-074846, filed on Mar. 31, 2014, the entire contents of which are incorporated herein by reference.

FIELD

The embodiments discussed herein are related to an apparatus, a method, and a computer program for image processing.

BACKGROUND

Techniques are known that detect the position and orientation of a portable terminal device. An example of such techniques uses an electromagnetic wave emitted by a base station. For example, the position is estimated based on the radio field intensity of the electromagnetic wave received by the portable terminal device from a base station, such as an access point of a wireless local area network (LAN) or an ultra-wideband (UWB) base station. Although this technique is suitable for estimating a rough position of the portable terminal device, the accuracy of the technique has its own limitations.

Another example of such techniques uses a marker. In this case, the position and orientation of the marker displayed on a display of the portable terminal device is detected from an image captured by a camera installed on the side of the environment. Using the marker in this manner allows the position and orientation to be detected more accurately than in the case of using the radio field intensity.

Conventional techniques are described, for example, in the following patent documents:

Japanese Laid-open Patent Publication No. 2013-101128; and

Japanese Laid-open Patent Publication No. 2010-20374.

As will be described below, however, the technique described above is difficult to detect a low-resolution marker.

Specifically, the above-mentioned camera on the environment side is not necessarily installed at a location from which the camera can capture the marker at a high resolution. For example, in some cases, the camera is installed at a location, such as on a ceiling, from which the environment can be viewed down so as to expand a range allowing the camera to capture the marker to a larger range. In this case, the camera captures the image from a location relatively far from the marker, so that the marker displayed in the image is smaller, resulting in capturing a low-resolution marker. When the marker is captured at a low resolution in this manner, it is difficult to detect the position and orientation of the marker, and it is difficult to identify identification information indicated at the marker. This problem restricts the location of the camera installed on the environment side, thus impairing the versatility of the marker detection.

SUMMARY

According to an aspect of an embodiment, an image processing apparatus includes a processor. The processor executes a process including: generating a hypothesis group for marker areas and marker identifiers by randomly scattering hypotheses including the marker areas and the marker identifiers in a range in which the hypotheses are possibly made; evaluating each of the hypotheses for the marker areas and the marker identifiers using image information on markers; replicating, when a variance value of a marker area in a hypothesis including a marker identifier satisfying a predetermined condition is a predetermined threshold or larger, a hypothesis for a certain marker area and a certain marker identifier extracted from the hypothesis group, based on the evaluation result; reconstructing the hypothesis group by changing the replicated hypothesis based on a degree of similarity between markers and on a neighborhood probability of a marker based on the degree of similarity; and causing repetitive execution of the evaluating, the replicating, and the reconstructing until the variance value becomes smaller than the threshold in the reconstructed hypothesis group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is a diagram illustrating an example of a disclosure setting table; and

DESCRIPTION OF EMBODIMENTS

Preferred embodiments will be explained with reference to accompanying drawings. The embodiments below do not limit the technique disclosed herein. The embodiments can also be combined as appropriate unless the details of processing thereof conflict with each other.

[a] First Embodiment

Figure 1:
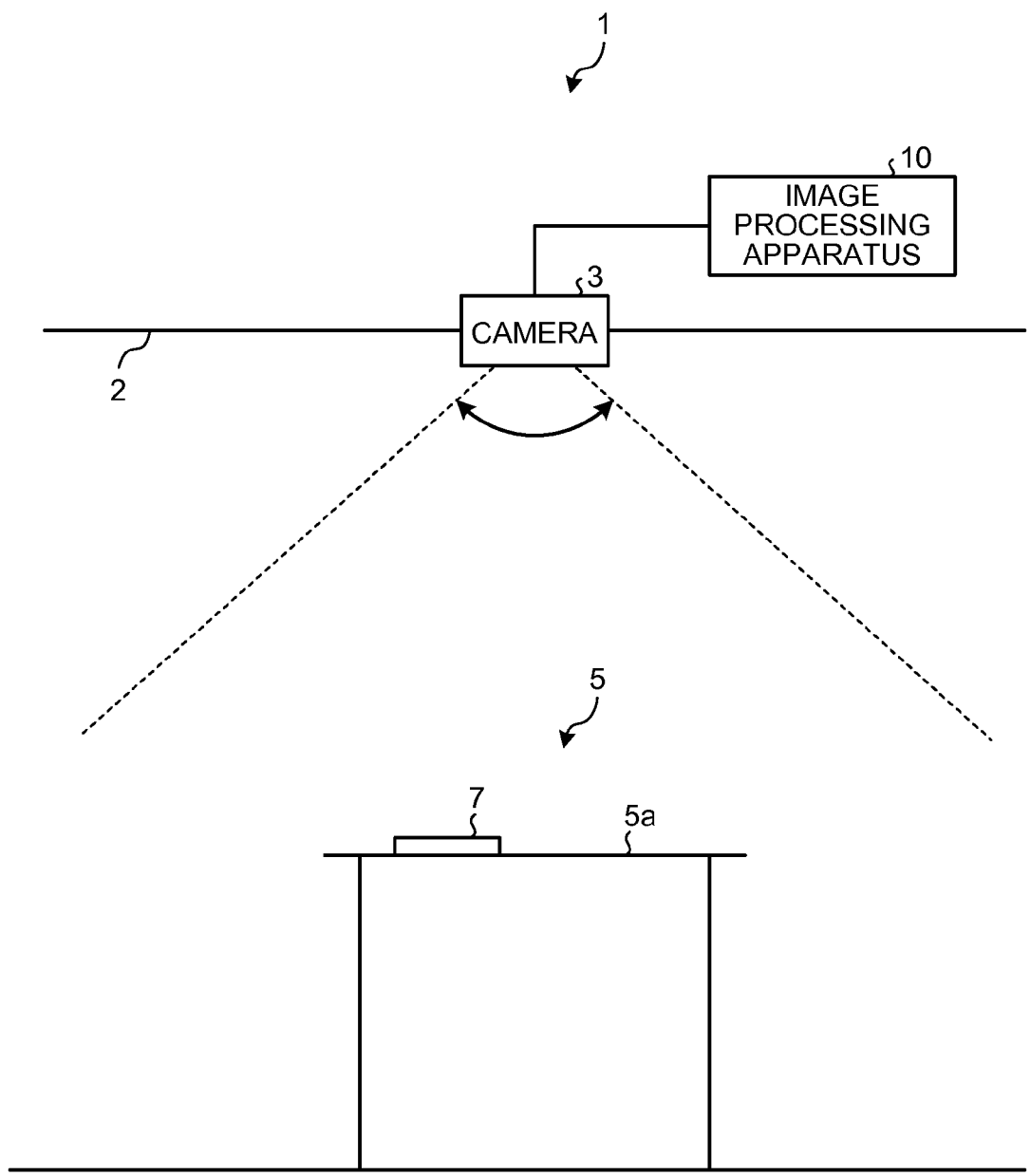
FIG. 1 is a diagram illustrating the configuration of a marker detection system according to a first embodiment of the present invention.

FIG. 1 is a diagram illustrating the configuration of a marker detection system according to a first embodiment of the present invention. This marker detection system 1 illustrated in FIG. 1 performs a marker detection process of detecting a region and an identifier (ID) of a marker displayed on a portable terminal device 7 from an image captured by a camera 3 installed on the environment side. While FIG. 1 assumes a case of capturing the marker on the portable terminal device 7 placed on a top surface 5a of a table 5, the portable terminal device 7 may be placed on a surface of anything other than the table 5.

As illustrated in FIG. 1, the marker detection system 1 houses the camera 3, the portable terminal device 7, and an image processing apparatus 10. While FIG. 1 illustrates one portable terminal device, the marker detection system 1 may house any number of portable terminal devices.

The camera 3 and the image processing apparatus 10 are connected so as to be capable of communicating with each other via a predetermined network. Examples of the network that can be employed include, but are not limited to, any types of communication networks, such as the Internet, local area networks (LANs), and virtual private networks (VPNs), regardless of whether they are wired or wireless.

The camera 3 is an image-capturing device that includes an image pickup device, such as a charge-coupled device (CCD) or a complementary metal-oxide-semiconductor (CMOS).

As an embodiment, the camera 3 can include three or more types of light receiving elements, such as those for red (R), green (G), and blue (B). The camera 3 is set at a location where the top surface 5a of the top board of the table 5 is included in the imaging range of the camera 3. For example, the camera 3 is installed in an environment, such as on a ceiling 2, from which the top surface 5a of the table 5 can be viewed down in the state in which the lens directly faces the top surface 5a of the table 5 from the ceiling 2. In this case, for example, a dome camera or an embedded camera can be employed as the camera 3. The camera 3 can employ any lens constitution, and may employ, for example, a fish-eye lens to obtain a wider angle of view.

The portable terminal device 7 is a terminal device of a portable type.

As an embodiment, a mobile communication terminal, such as a smartphone, a mobile phone, or a personal handyphone system (PHS), or a tablet computer, such as a slate computer, can be employed as the portable terminal device 7.

Figure 2:
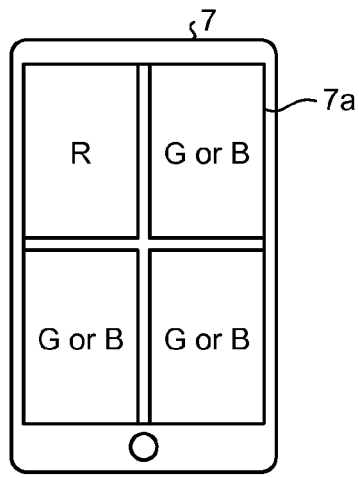
FIG. 2 is a diagram illustrating a display example of a marker.

The portable terminal device 7 can display a predetermined marker on the display unit. FIG. 2 is a diagram illustrating a display example of the marker. FIG. 2 illustrates a case of displaying one of eight types of markers that identify eight IDs of ID "0" to ID "7". As illustrated in FIG. 2, the marker formed so as to include four blocks is displayed on a display unit 7a of the portable terminal device 7. The four blocks include one reference block and three bit blocks. Of these blocks, the reference block refers to a block whose display position and display color are fixed. For example, the reference block is displayed in red color R in the upper left position among the upper left, upper right, lower left, and lower right positions. This applies to all cases in which the marker indicates any ID of the IDs 0 to 7. The bit blocks refer to blocks representing a 3-bit array, and are displayed, for example, in the upper right, lower left, and lower right positions. Each of the bit blocks displays, for example, either color of green color G representing 0 and blue color B representing 1. The display color varies depending on which ID of the IDs 0 to 7 is indicated by the marker. The blocks are divided into cross sections by white display so that boundary portions between the sections are clearly displayed with the image. While FIG. 2 illustrates a case in which the outer frame of the marker is not particularly highlighted, the outer frame of the marker can be highlighted by being displayed with a thick black frame.

Figure 3:
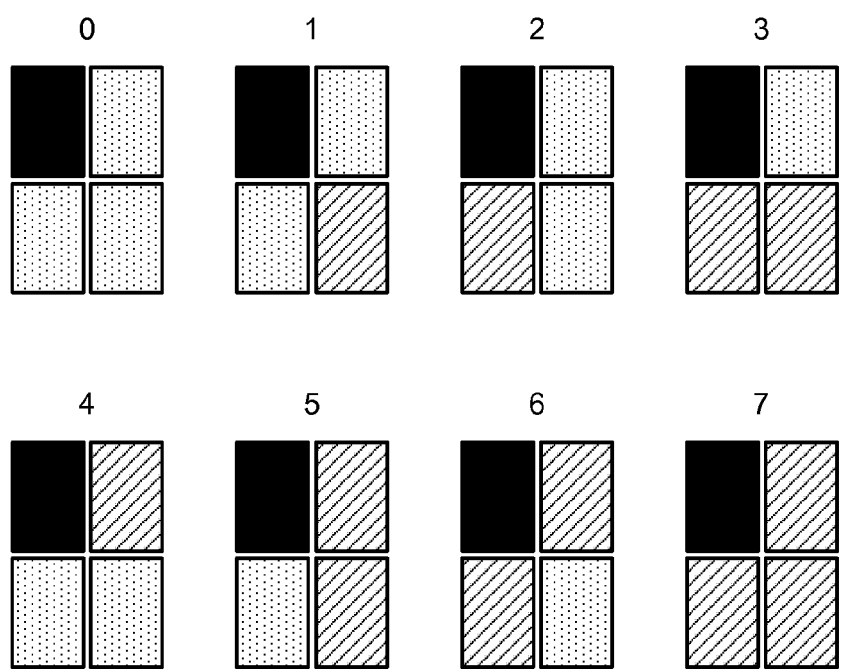
FIG. 3 is a diagram illustrating examples of marker identifiers (IDs)

FIG. 3 is a diagram illustrating examples of the marker IDs. FIG. 3 illustrates the eight types of markers that represent the eight IDs of 0 to 7. FIG. 3 illustrates sections filled with black representing "red color R", sections filled with dots representing "green color G", and section filled with slant lines representing "blue color B". In the first marker from the left in the upper row illustrated in FIG. 3, "green color G", "green color G", and "green color G" are arranged in the order of the upper right, lower left, and lower right blocks. This arrangement represents that the bit array is "000", and thereby means that the marker ID is 0. In the second marker from the left in the upper row illustrated in FIG. 3, "green color G", "green color G", and "blue color B" are arranged in the order of the upper right, lower left, and lower right blocks. This arrangement represents that the bit array is "001", and thereby means that the marker ID is 1. Subsequently, in the same manner, the third marker from the left in the upper row illustrated in FIG. 3 represents that the bit array is "010", and thereby means that the marker ID is 2. Furthermore, the fourth marker from the left in the upper row illustrated in FIG. 3 represents that the bit array is "011", and thereby means that the marker ID is 3. Moreover, in the same manner, the markers in the lower row illustrated in FIG. 3 represent that the bit arrays are "100", "101", "110", and "111", and thereby mean that the marker IDs are 4, 5, 6, and 7 in the order from the left.

The image processing apparatus 10 is a computer that executes the marker detection process described above.

As an embodiment, the image processing apparatus 10 may be implemented as a web server that executes the marker detection process described above, or as a cloud computer that provides, through outsourcing, a marker detection service performed by the marker detection process. The image processing apparatus 10 can also be implemented by preinstalling or installing an image processing program provided as a service oriented architecture (SOA) program, package software, or on-line software in a desired computer.

Configuration of Image Processing Apparatus 10

Figure 4:
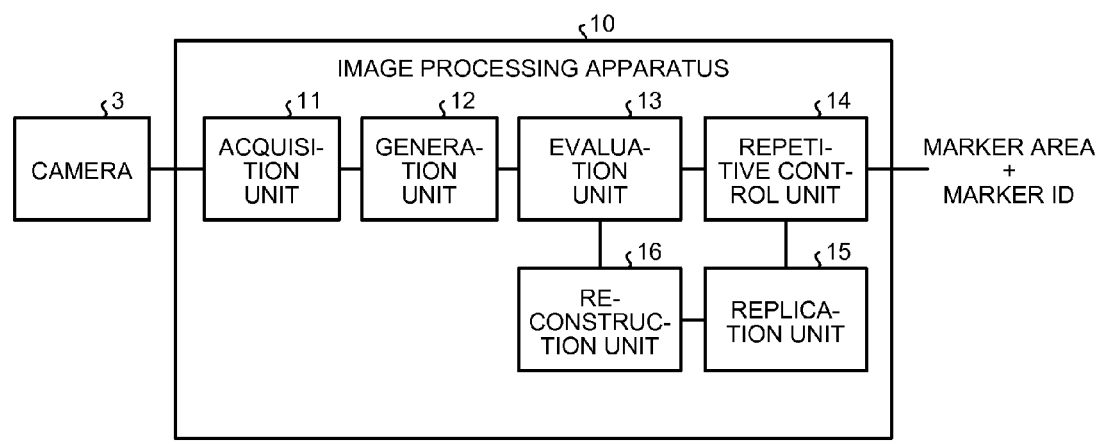
FIG. 4 is a block diagram illustrating the functional configuration of an image processing apparatus according to embodiments of the present invention.

FIG. 4 is a block diagram illustrating the functional configuration of the image processing apparatus according to the embodiments of the present invention. As illustrated in FIG. 4, the image processing apparatus 10 includes an acquisition unit 11, a generation unit 12, an evaluation unit 13, a repetitive control unit 14, a replication unit 15, and a reconstruction unit 16. The image processing apparatus 10 may include, in addition to the functional units illustrated in FIG. 4, various functional units, such as various types of input/output devices, audio output devices, and imaging devices, included in a well-known computer.

The acquisition unit 11 is a processing unit that acquires an image.

As an embodiment, the acquisition unit 11 acquires an image captured by the camera 3. In this process, the acquisition unit 11 may acquire a moving image encoded with a predetermined compression coding method each time the image is taken by the camera 3, or may acquire each still image. As another embodiment, the acquisition unit 11 can acquire an image from an auxiliary storage device, such as a hard disk or an optical disc, or from a removable medium, such as a memory card or a universal serial bus (USB) memory, in which the image is stored. As still another embodiment, the acquisition unit 11 can acquire an image by receiving the image from an external device via a network.

In the description below, an image in an original state before image processing is applied thereto, such as an image captured by the camera 3, may be mentioned as "original image".

The generation unit 12 is a processing unit that generates a hypothesis group with respect to markers.

What is called the "hypothesis" mentioned above refers to data that assumes a marker area and a marker ID. The "marker area" includes the position, the orientation, and the size of a marker. For example, the "position" mentioned above refers to a position in which the marker is assumed to lie, and can be defined, for example, by an apex of the marker on the image, such as coordinates of the upper left apex with respect to the X- and Y-axes. The "orientation" mentioned above refers to an attitude assumed to be taken by the marker. As an example, a case is assumed here in which the portable terminal device 7 is placed on the top surface 5a of the table 5 in the state in which the marker displayed on the display unit 7a faces vertically upward, that is, directly faces the camera 3. In this case, the attitude about the X- and Y-axes is invariable, so that parameters can be narrowed down to the rotation from a reference orientation in the XY-plane, that is, the yaw angle about the Z-axis. The "size" mentioned above refers to a size in which the marker is assumed to be displayed. For example, the size can be defined by the length, such as the number of pixels, at which the long side or the diagonal line of the marker is displayed on the image.

From the above description, the hypothesis can be defined by state quantities (x, y, $\theta$, s, ID) of the marker area and the marker ID including the position (x, y), the rotation $\theta$, and the size s. In the description below, the respective parameters included in the hypothesis described above, that is, the position, the rotation, the size, and the ID may be collectively mentioned as "elements".

As an embodiment, the generation unit 12 generates a hypothesis group for marker areas and marker IDs by randomly scattering hypotheses for marker areas and marker IDs in a range in which the hypotheses can be made.

For example, to generate the marker IDs among the above-mentioned elements of the hypothesis, the generation unit 12 can generate uniform random numbers in the range of the number of types of the marker IDs 0 to 7 until a desired number of hypotheses is obtained.

To generate the elements with respect to the marker areas among the elements of the hypothesis, while the generation unit 12 can generate uniform random numbers in a range of values that can be taken by the position, the rotation, and the size until a desired number of hypotheses is obtained, the generation unit 12 can also generate normal random numbers using a color map such as that described below. For example, with reference to a red color map obtained by mapping the likelihood of red of each pixel in an image plane corresponding to an original image, the generation unit 12 can generate the hypotheses at a density that is higher in an area in which the likelihood of red is higher in the original image and in positions around the area.

As color maps such as that mentioned above, for example, red, green, and blue color maps can be created by converting the color space of the original image, for example, from a red-green-blue (RGB) to a hue-saturation-value (HSV) color space. Specifically, the generation unit 12 obtains the hue (H) and the saturation (S) of each pixel of the original image. Thereafter, with reference to a red color model obtained by setting in advance the likelihood of red in an H-S plane of the hue (H) and the saturation (S), such as the likelihood obtained by normalizing, with peak values, the frequencies of values of H and S at which the red of the reference block of the marker can be displayed in the image, the generation unit 12 obtains the likelihood of red corresponding to the hue (H) and the saturation (S) obtained earlier, for each pixel of the original image. The red color map can be created by expressing the likelihood of red of each pixel obtained in this manner in the image plane corresponding to the original image. A green color map and a blue color map can also be created in the same manner except that different color models are used for creating the color maps. From the viewpoint of reducing the amount of calculation for the value of color, the case has been illustrated in which the color map is created by converting the color space. The color map can, however, be created without the need for converting the color space.

The evaluation unit 13 is a processing unit that evaluates the individual hypothesis for the marker area and the marker ID using image information on the marker.

As an embodiment, the evaluation unit 13 uses the red color map, the green color map, and the blue color map described above to calculate an evaluation value for a hypothesis included in the hypothesis group generated by the generation unit 12 or the hypothesis group reconstructed by the reconstruction unit 16 (to be described later). Specifically, the evaluation unit 13 superimposes the red, the green, and the blue color maps on the original image. Then, for each of the blocks of a marker defined by the hypothesis, the evaluation unit 13 calculates the evaluation value according to the degree of similarity in colors between the block and the area of the red, the green, or the blue color map that lie in the same relative position as the block. For example, if the marker ID of the hypothesis is 1, the evaluation unit 13 calculates the evaluation value by comparing an area defined to be the reference block by the hypothesis with the area of the red color map that lies in the same relative position as the area of the reference block, and by comparing areas of the bit blocks defined to be green, green, and blue by the hypothesis with the areas of the green color map, the green color map, and the blue color map, respectively, that lie in the same relative positions as the areas of the bit blocks. This calculation obtains the evaluation value for each of the hypotheses included in the hypothesis group.

The repetitive control unit 14 is a processing unit that causes repetitive execution of evaluation, replication, and reconstruction until a variance value of a marker area in a hypothesis including a marker identifier satisfying a predetermined condition becomes smaller than a predetermined threshold.

As an embodiment, for each of the hypotheses included in the hypothesis group set by the generation unit 12 or the hypothesis group reconstructed by the reconstruction unit 16 (to be described later), the repetitive control unit 14 casts a vote of the marker ID of the hypothesis for the same marker ID. This process can obtain the total value for the marker ID for each of the marker IDs. The repetitive control unit 14 applies majority voting among the marker IDs according to the total value. Specifically, the repetitive control unit 14 determines the marker ID among the marker IDs that is voted for by most hypotheses, that is, the marker ID with the largest total value to be an elected marker ID. Subsequently, the repetitive control unit 14 extracts a hypothesis that supports the elected marker ID in the hypothesis group, in other words, a hypothesis that has voted for the elected marker ID. In the description below, the hypothesis that supports the elected marker ID in the hypothesis group may be mentioned as "support group".

The repetitive control unit 14 calculates the mean and the variance of the marker area of the support group described above. At this point, if the variance of the marker area of the support group is smaller than the predetermined threshold, the marker area can be presumed to have sufficiently converged. In this case, the repetitive control unit 14 outputs the mean value of the marker area of the support group and the elected marker ID as detection results of the marker. If the variance of the marker area of the support group is the predetermined threshold or larger, it can be presumed that the marker area has not converged and that the hypothesis remains to be reconstructed. In this case, functional units in the subsequent stages reconstruct the hypothesis.

The replication unit 15 is a processing unit that replicates the hypothesis.

As an embodiment, if the variance of the marker area of the support group is the predetermined threshold or larger, the replication unit 15 replicates the hypothesis based on the amount of the evaluation value calculated for each of the hypotheses included in the hypothesis group. For example, as the evaluation value of a hypothesis is larger, the replication unit 15 replicates more hypotheses from the hypothesis, whereas, as the evaluation value of a hypothesis is smaller, the replication unit 15 replicates fewer hypotheses from the hypothesis or eliminates the hypothesis without replicating it. This process narrows down the hypotheses to be reconstructed in the hypothesis group to a likely hypothesis.

The reconstruction unit 16 is a processing unit that reconstructs the marker area and the marker ID for each of the hypotheses replicated by the replication unit 15.

As an embodiment, the reconstruction unit 16 reconstructs the hypothesis group by changing the hypothesis replicated by the replication unit 15 based on the degree of similarity between marker IDs and on the neighborhood probability of the marker based thereon.

For example, to reconstruct the position (x, y) among the elements of the hypothesis, the reconstruction unit 16 changes the position to the neighborhood of the position (x, y). For example, the reconstruction unit 16 randomly generates a point according to a two-dimensional Gaussian distribution defined by parameters including the position (x, y) included in the original hypothesis as the mean and a predetermined variance. The position of the point thus generated is reconstructed as the position of the hypothesis after being changed.

To reconstruct the rotation θ among the elements of the hypothesis, the reconstruction unit 16 changes the rotation to the neighborhood of the rotation θ. For example, the reconstruction unit 16 randomly generates a value of the rotation according to a one-dimensional Gaussian distribution defined by parameters including the rotation θ included in the original hypothesis as the mean and a predetermined variance. The value thus generated is reconstructed as the rotation of the hypothesis after being changed.

To reconstruct the size s among the elements of the hypothesis, the reconstruction unit 16 changes the size to the neighborhood of the size s. For example, the reconstruction unit 16 randomly generates a value of the size according to a one-dimensional Gaussian distribution defined by parameters including the size s included in the original hypothesis as the mean and a predetermined variance. The value thus generated is reconstructed as the size of the hypothesis after being changed.

To reconstruct the marker ID among the elements of the hypothesis, the reconstruction unit 16 randomly changes the marker to a nearby marker by stochastically defining the nearby marker based on the degree of similarity in patterns included in the markers between different marker IDs.

Figure 5:
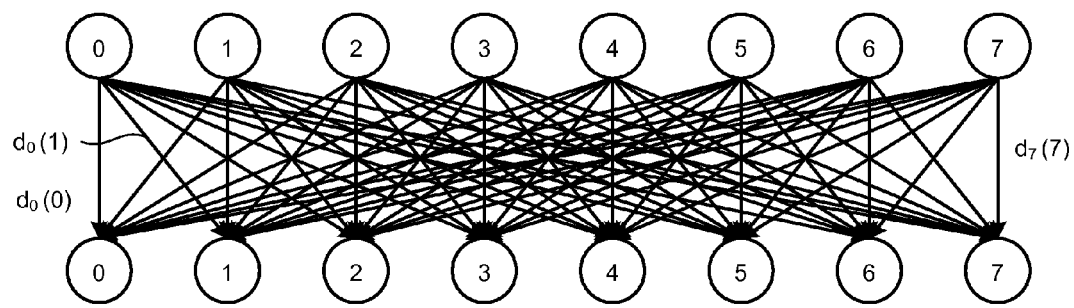
FIG. 5 is a diagram illustrating examples of combinations between the marker IDs.

For example, the reconstruction unit 16 calculates the degree of similarity in patterns between marker IDs for every combination between the marker IDs. For example, in the example of the marker IDs illustrated in FIG. 3, assuming i and j as integers from 0 to 7, the reconstruction unit 16 calculates a Hamming distance as a degree of similarity $d_i(j)$ between a marker IDi and a marker IDj by calculating the sum of absolute values of differences between bits between the marker IDi and the marker IDj. FIG. 5 is a diagram illustrating examples of combinations between the marker IDs. FIG. 5 illustrates all combinations between IDs for the eight marker IDs 0 to 7. As illustrated in FIG. 5, focusing on the marker ID "0", there are eight combinations as follows: the combination between ID "0" and ID "0"; the combination between ID "0" and ID "1"; . . . ; and the combination between ID "0" and ID "7". In the same manner, there are also combinations for IDs 1 to 7. As a result, as illustrated in FIG. 5, a total of 64 degrees of similarity $d_i(j)$ between the marker IDi and the marker IDj are calculated, so that the degrees of similarity $d_i(j)$ can be represented by a matrix of eight rows and eight columns.

Thereafter, the reconstruction unit 16 calculates a stochastic neighborhood matrix $p_i(j)$ from the above-described matrix of the degrees of similarity $d_i(j)$ according to Expression (1) below. The symbol "k" appearing in Expression (1) below represents a predetermined constant. The matrix $p_i(j)$ represents a probability that the marker IDi is near the marker IDj. The above-described stochastic neighborhood matrix $p_i(j)$ can be calculated in advance and set in a work area of an internal memory (not illustrated) used by the reconstruction unit 16.

Math. 1

$$p_i(j)=e^{-k(d_i(j))^2} \quad (1)$$

Figure 6:
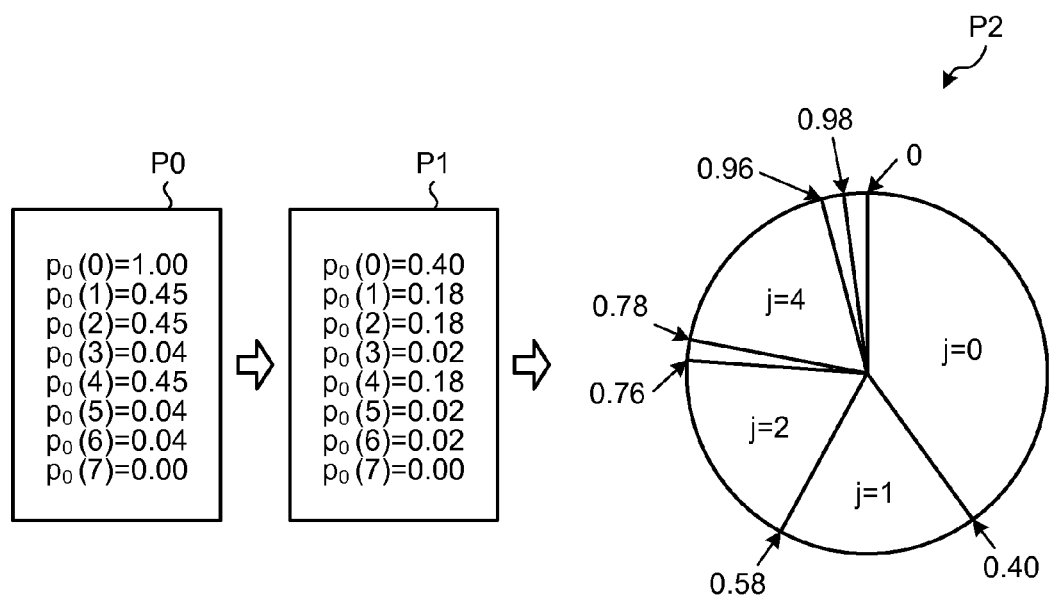
FIG. 6 is a diagram illustrating an example of reconstruction of a marker ID.

Based on the stochastic neighborhood matrix $p_i(j)$, the reconstruction unit 16 changes the marker IDs included in the hypothesis according to the stochastic neighborhood matrix $p_i(j)$. FIG. 6 is a diagram illustrating an example of the reconstruction of the marker ID. FIG. 6 illustrates the reconstruction in the case in which the marker ID of the hypothesis before being changed is 0. FIG. 6 illustrates, in "P0", the neighborhood probabilities, $p_0(0)$ to $p_0(7)$, when the parameter k in Expression (1) above is set to 0.5, and in "P1", the neighborhood probabilities after being normalized so that the total sum of $p_0(0)$ to $p_0(7)$ is 1.

As illustrated in FIG. 6, the reconstruction unit 16 normalizes $p_0(0)$ to $p_0(7)$ so that the total sum thereof is 1, and then creates a pie chart P2 from the neighborhood probabilities included in $p_0(0)$ to $p_0(7)$ after being normalized. Thereafter, the reconstruction unit 16 generates a random number in the range from 0 to 1, inclusive. For example, if the random number has a value of 0.6, the random number belongs to the sector for j=2. In this case, the reconstruction unit 16 changes the marker ID of the hypothesis from 0 to 2. If the random number has a value of 0.3, the random number belongs to the sector for j=0. In this case, the reconstruction unit 16 changes marker ID of the hypothesis from 0 to 0. If the random number has a value of 0.8, the random number belongs to the sector for j=4. In this case, the reconstruction unit 16 changes marker ID of the hypothesis from 0 to 4.

Thus, the marker area and the marker ID of each of the hypotheses are reconstructed. Then, the evaluation value of the reconstructed hypothesis is calculated again by the evaluation unit 13. Thereafter, the above-described series of marker search operations of the replication, the reconstruction, and the evaluation is repeated until the variance of the marker area of the support group becomes smaller than the threshold. If the variance of the marker area of the support group is smaller than the threshold, the mean of the marker area of the support group and the elected marker ID are output as marker detection results.

The acquisition unit 11, the generation unit 12, the evaluation unit 13, the repetitive control unit 14, the replication unit 15, and the reconstruction unit 16, which have been described above, can be implemented by executing a pulse wave detection program on a central processing unit (CPU), a microprocessing unit (MPU), or the like. The functional units mentioned above can also be implemented by a hard-wired logic circuit, such as an application-specific integrated circuit (ASIC) or a field-programmable gate array (FPGA).

The internal memory mentioned above can employ, for example, a semiconductor memory device or a storage device. Examples of the semiconductor memory device include, but are not limited to, a flash memory, a dynamic random access memory (DRAM), and a static random access memory (SRAM). Examples of the storage device include, but are not limited to, a hard disk and an optical disc.

Specific Example

Figure 7:
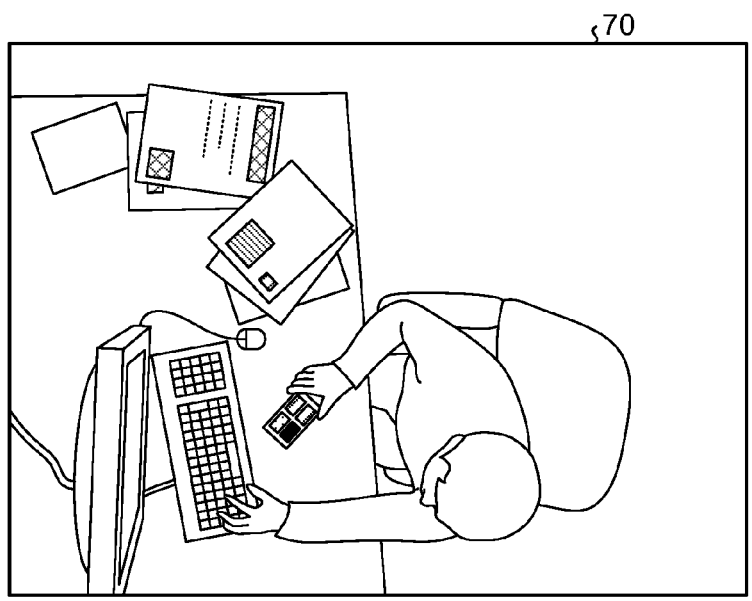
FIG. 7 is a diagram illustrating an example of an original image.
Figure 8A:
FIG. 8A is a diagram illustrating an example of a red color map.
Figure 8B:
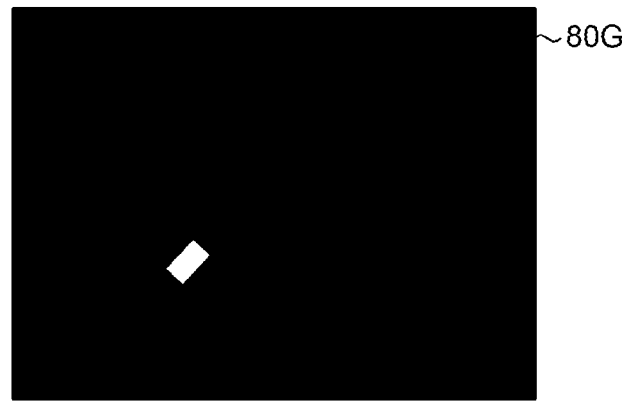
FIG. 8B is a diagram illustrating an example of a green color map.
Figure 8C:
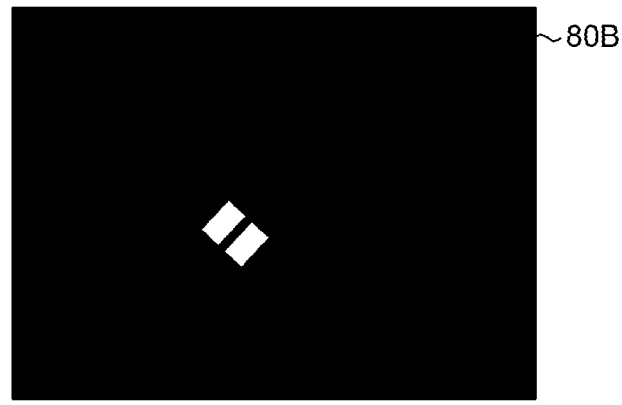
FIG. 8C is a diagram illustrating an example of a blue color map.
Figure 9:
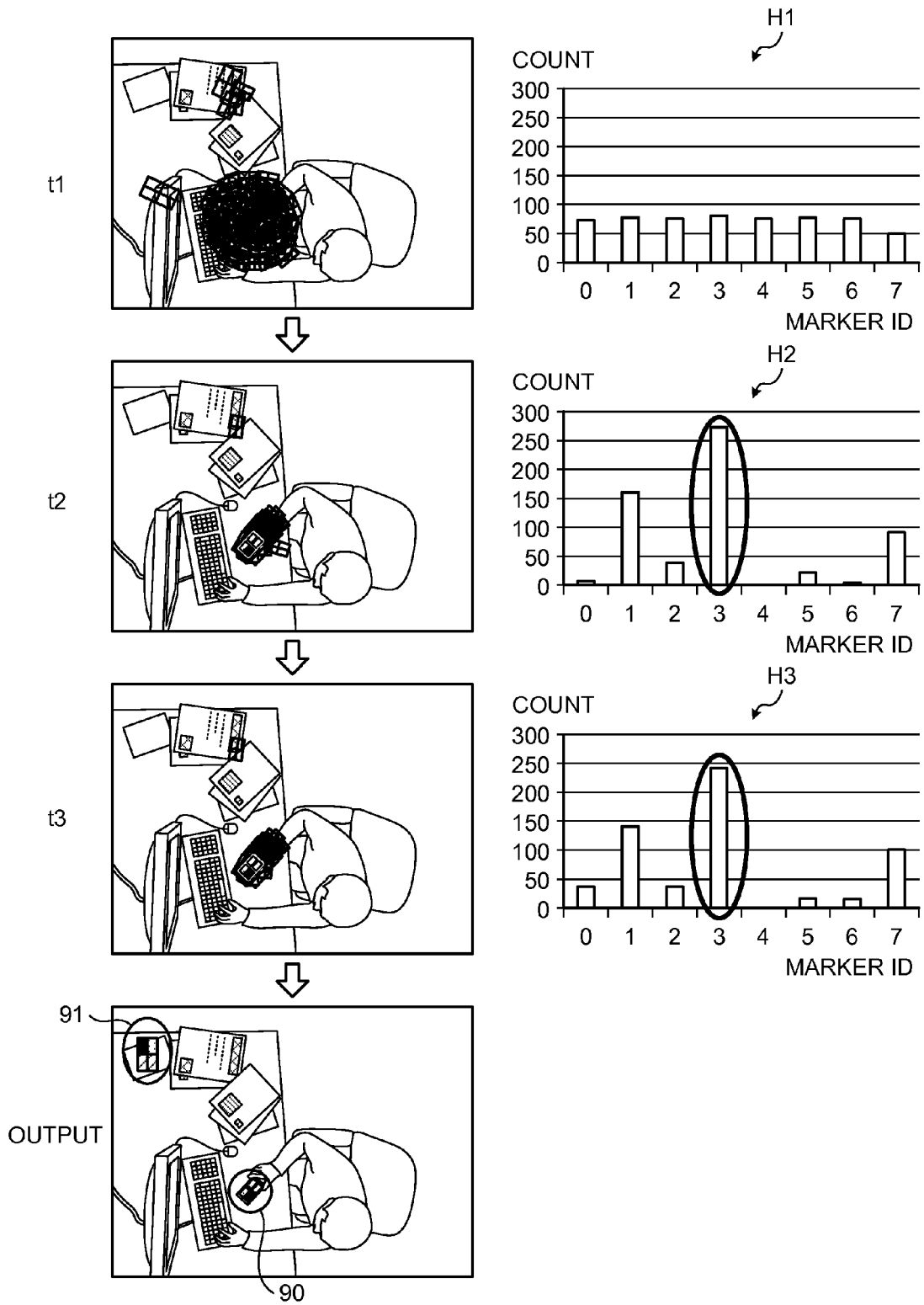
FIG. 9 is a diagram illustrating a transition example obtained by repeating reconstructing a hypothesis.

A specific example of the marker detection will be described using FIGS. 7 to 9. FIG. 7 is a diagram illustrating an example of the original image. FIG. 8A is a diagram illustrating an example of the red color map; FIG. 8B is a diagram illustrating an example of the green color map; and FIG. 8C is a diagram illustrating an example of the blue color map. FIG. 9 is a diagram illustrating a transition example obtained by repeating reconstructing a hypothesis. FIGS. 7 to 9 illustrate a processing example of a case in which the portable terminal device 7 is placed on the top surface 5a of the table 5 in the state in which a marker with a marker ID of 3 is displayed on the display unit 7a.

For an original image 70 illustrated in FIG. 7, a hypothesis group is initialized by randomly scattering hypotheses in a range of values that can be taken by the marker area and the marker ID. At this point, using a red color map 80R illustrated in FIG. 8, the hypotheses are generated at a density that is higher in an area in which the likelihood of red is higher in the original image 70 and in positions around the area, whereby the hypothesis group at an initialization time t1 illustrated in FIG. 9 is obtained. The red color map 80R, a green color map 80G, and a blue color map 80B are superimposed on each of the hypotheses included in the hypothesis group thus obtained. Thereafter, the evaluation value for each of the hypotheses is calculated by comparing an area defined to be the reference block by the hypothesis with the area of the red color map that lies in the same relative position as the area of the reference block, and by comparing areas of the bit blocks defined by the hypothesis with the areas of the green or green color maps that lie in the same relative positions as the areas of the bit blocks.

A histogram H1 is formed from voting results of the marker IDs by the respective hypotheses included in the hypothesis group at the initialization time t1 illustrated in FIG. 9. In the histogram H1, the frequencies of the marker IDs 0 to 7 are roughly uniform relative to one another, but the ID of 3 is determined to be the elected marker ID by a narrow margin.

Thereafter, if the replication and the reconstruction are performed on the hypothesis group obtained at the initialization time t1, a hypothesis group at a second time t2 illustrated in FIG. 9 is obtained. After evaluation values for the respective hypotheses included in the hypothesis group at the second time t2 are calculated, the respective hypotheses performs voting of the marker IDs, and a histogram H2 is obtained as a result of the voting. In the histogram H2, the frequency of the ID of 3 is the most outstanding, and the frequency of the ID of 1 and then the frequency of the ID of 7 come next. In this case, the ID of 3 is determined to be the elected marker ID by a wide margin. In this case, the number of replicated hypotheses is larger in the order of IDs of 3, 1, and 7, and the hypotheses for IDs of 4, 6, and 0 are replicated in a smaller number or deleted.

If the reconstruction is performed on the hypothesis group obtained at the second time t2, a hypothesis group at a third time t3 illustrated in FIG. 9 is obtained. After evaluation values for the respective hypotheses included in the hypothesis group at the third time t3 are calculated, the respective hypotheses performs voting of the marker IDs, and a histogram H3 is obtained as a result of the voting. In the histogram H3, the frequency of the ID of 3 is still significantly outstanding. In this case, the variance of the marker area of the support group supporting the elected marker ID of 3 is smaller than the threshold, so that a mean 90 of the marker area of the support group and an elected marker ID 91 are output as detection results Output of the marker.

In this manner, in the present embodiment, both the marker area and the marker ID can be detected without first detecting the marker area in the image, so that detectivity does not depend on detection accuracy of the marker area. Hence, according to the present embodiment, a low-resolution marker can be detected.

Processing Flow

Figure 10:
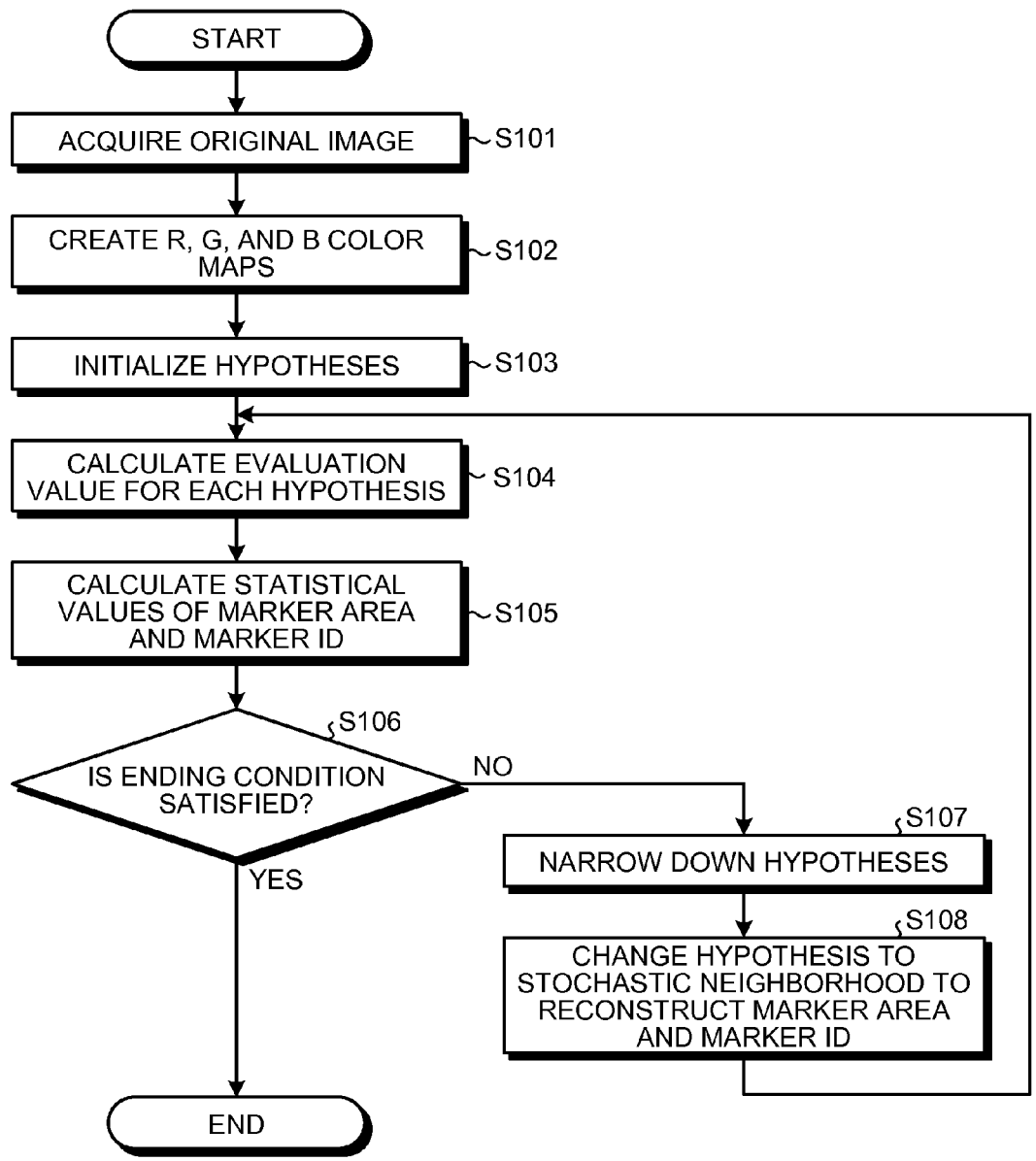
FIG. 10 is a flowchart illustrating a procedure of a marker detection process according to the first embodiment.

FIG. 10 is a flowchart illustrating a procedure of the marker detection process according to the first embodiment. The marker detection process can be performed each time the acquisition unit 11 acquires the original image. As illustrated in FIG. 10, when the original image is acquired (Step S101), the generation unit 12 creates the red, the green, and the blue color maps by converting the color space of the original image from the RGB to the HSV color space (Step S102).

The generation unit 12 subsequently initializes the hypothesis group by randomly scattering the hypotheses in the range of values that can be taken by the marker area and the marker ID (Step S103). The evaluation unit 13 uses the red, the green, and the blue color maps created at Step S102 to calculate the evaluation value for each hypothesis included in the hypothesis group generated at Step S103 (Step S104).

The repetitive control unit 14 thereafter calculates the mean and the variance of the marker area of the support group supporting the elected marker ID obtained by majority voting of the marker IDs by the hypothesis group (Step S105).

If the variance of the marker area of the support group is the predetermined threshold or larger, that is, if an ending condition is not satisfied (No at Step S106), the replication unit 15 narrows down the hypotheses to be reconstructed in the hypothesis group to a likely hypothesis (Step S107). Specifically, as the evaluation value of the hypothesis is larger, more hypotheses are replicated by the replication unit 15, whereas, as the evaluation value of the hypothesis is smaller, fewer hypotheses are replicated, or the hypothesis is eliminated without being replicated, by the replication unit 15.

The reconstruction unit 16 subsequently reconstructs the marker area and the marker ID for each hypothesis narrowed down at Step S107 (Step S108). Then, the processes at Steps S104 and S105 are repeatedly performed on the reconstructed hypothesis group.

Thereafter, if the variance of the marker area of the support group is smaller than the threshold, that is, if the ending condition is satisfied (Yes at Step S106), the repetitive control unit 14 outputs the mean value of the marker area of the support group and the elected marker ID as detection results of the marker, and then, the process ends.

One Aspect of Effects

As has been described above, the image processing apparatus 10 according to the present embodiment generates hypotheses for the marker including the marker area and the marker ID, and reconstructs the marker ID of each of the hypotheses into a stochastically close ID until the variance of the marker area of the support group having the highest number of marker IDs in the hypothesis group becomes smaller than the threshold. Hence, both the marker area and the marker ID can be simultaneously searched for without first performing the procedure of detecting the marker ID. As a result, the marker detection can be performed in which the detectivity does not depend on the detection accuracy of the marker area. Consequently, the image processing apparatus 10 according to the present embodiment enables detection of a low-resolution marker.

[b] Second Embodiment

While the embodiment of the apparatus disclosed herein has been described above, the present invention may be implemented in various different embodiments in addition to the embodiment described above. The following describes another embodiment included in the present invention.

Application Scene

Figure 11:
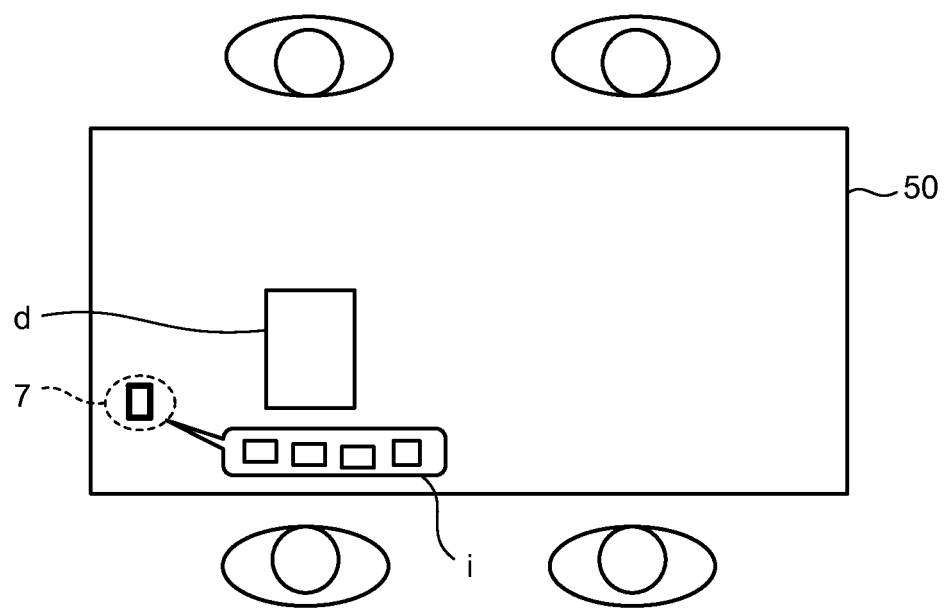
FIG. 11 is a diagram illustrating an implementation example of the image processing apparatus.

The image processing apparatus 10 described in the first embodiment above can be implemented in any application scene. An example of the application scene will be described. FIG. 11 is a diagram illustrating an implementation example of the image processing apparatus 10. FIG. 11 illustrates a case in which the image processing apparatus 10 described in the first embodiment is implemented as a smart table 50.

As illustrated in FIG. 11, when the marker area of the portable terminal device 7 is detected, the smart table 50 controls a projector (not illustrated) to project icons for contents included in the portable terminal device 7 in a certain region i on the top surface of the smart table 50, or project thereon data d corresponding to a content.

Figure 12:
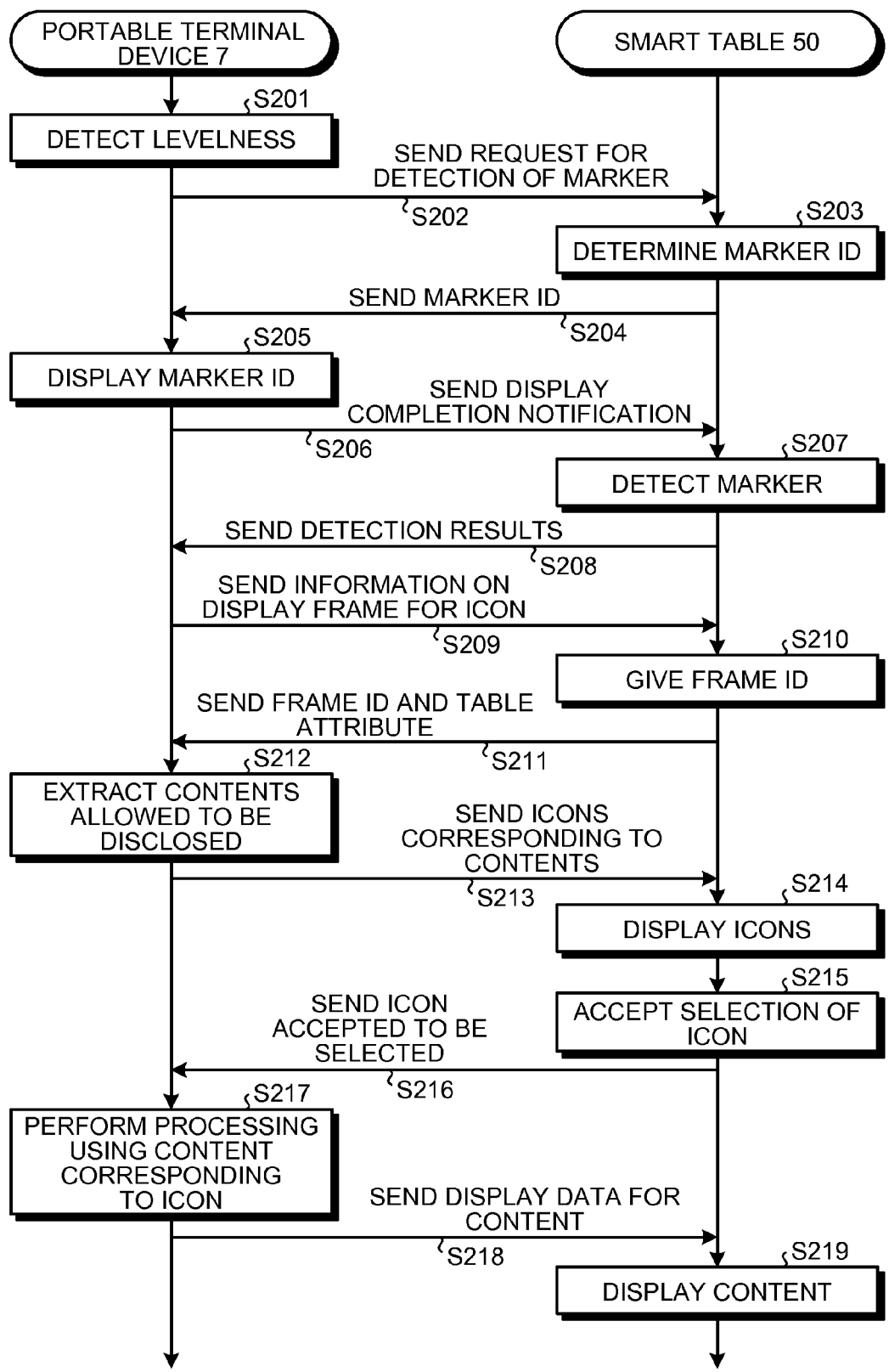
FIG. 12 is a diagram illustrating a control sequence of a process executed between a portable terminal device and a smart table according to a second embodiment of the present invention.

FIG. 12 is a diagram illustrating a control sequence of the process executed between the portable terminal device 7 and the smart table 50 according to a second embodiment of the present invention. As illustrated in FIG. 12, the portable terminal device 7 uses a motion sensor provided as standard equipment to detect levelness of the display surface of the display unit 7a (Step S201). For example, the portable terminal device 7 can detect that the display surface of the display unit 7a is level if an acceleration sensor does not detect vibration, or if the pitch angle, the roll angle, and the yaw angle indicate the levelness. If the levelness of the display surface of the display unit 7a is detected in this manner, the portable terminal device 7 sends a request for detection of a marker to the smart table 50 (Step S202).

In response to this request, the smart table 50 determines the marker ID of a marker to be displayed on the portable terminal device 7 (Step S203), and sends the marker ID to the portable terminal device 7 (Step S204). Then, the portable terminal device 7 displays the marker corresponding to the marker ID received at Step S204 on the display unit 7a (Step S205), and then sends a display completion notification of the marker to the smart table 50 (Step S206).

The smart table 50 subsequently performs the marker detection process illustrated in FIG. 10 (Step S207). This process obtains the marker area, such as the position, the rotation, and the size, of the marker ID that is designated to be displayed at Step S204 and displayed on the portable terminal device 7 placed on the smart table 50. The smart table 50 then sends the detection results of the marker area obtained at Step S207 to the portable terminal device 7 (Step S208).

In response, the portable terminal device 7 determines, from the marker area received at Step S208, a display frame i in which icons for contents included in the portable terminal device 7 are displayed on the smart table 50, such as a region near the position of a user of the portable terminal device 7 estimated from the marker area, and sends information on the display frame i to the smart table 50 (Step S209).

Then, the smart table 50 gives the display frame i received at Step S209 a frame ID for identifying the frame (Step S210). Thereafter, the smart table 50 sends, in addition to the frame ID of the display frame i that is given the frame ID at Step S210, attribute information on the location where the smart table 50 is placed as a table attribute to the portable terminal device 7 (Step S211).

With reference to a disclosure setting table 7b illustrated in FIG. 13, the portable terminal device 7 extracts, from the contents stored in the portable terminal device 7, contents for which disclosure levels are set such that disclosure is allowed for the table attribute received at Step S211 (Step S212).

FIG. 13 is a diagram illustrating an example of the disclosure setting table 7b. The disclosure setting table 7b illustrated in FIG. 13 is a table associating the table attribute, the disclosure level, and the allowability with one another. For example, the disclosure level indicates the range in which disclosure is allowed. The range increases in the order from "personal", "involved parties", "in-house", to "all". As for the table attribute, the level of confidentiality increases in the order from "public", "reception", "in-house", "meeting room", to "desk". In the case of the example illustrated in FIG. 13, if the disclosure level of a content is set to "all", disclosure of the content is allowed for all table attributes. If the disclosure level of a content is set to "in-house", disclosure of the content is allowed unless the table attribute is "public" or "reception", in other words, if the table attribute is "in-house", "meeting room" or "desk". If the disclosure level of a content is set to "involved parties", disclosure of the content is allowed unless the table attribute is "public", "reception", or "in-house", in other words, if the table attribute is "meeting room" or "desk". If the disclosure level of a content is set to "personal", disclosure of the content is allowed only if the table attribute is "desk".

Coming back to the description using FIG. 12, the portable terminal device 7 sends icons corresponding to the contents extracted at Step S212 and the frame ID to the smart table 50 (Step S213). Examples of the contents include, but are not limited to, applications, such as browsers, word processor software, and spreadsheet software, and files, such as data files, photograph files, portable document format (PDF) files, and moving image files, used by applications. When the icons for the contents are sent, icons for applications can be sent if the contents are related to the applications; thumbnail images for image data can be sent as the icons if the contents are the image data such as still images or moving images; or, thumbnail images for front pages of PDF files can be sent as the icons if the contents are the PDF files. The contents may be links, such as uniform resource locators (URLs) for accessing certain web servers or cloud computers.

The smart table 50 thereafter displays the icons sent at Step S213 in the display frame i identified by the frame ID (Step S214). After receiving an operation of selecting an icon on the smart table 50 (Step S215), the smart table 50 sends information on the icon for which the selection operation is received to the portable terminal device 7 (Step S216).

The portable terminal device 7 subsequently performs processing using the content corresponding to the icon received at Step S216 (Step S217), and sends display data for a content generated as a result of the processing and the frame ID to the smart table 50 (Step S218). In response, the smart table 50 displays the display data for the content received at Step S218 in a position having a predetermined relation with the display frame i identified by the frame ID, for example, in a position on the far side of the display frame i (Step S219).

As has been described above, the smart table 50 according to the present embodiment can extract contents that may be viewed by another person from contents included in the portable terminal device 7 and display icons for the contents, or can display one of the contents. As a result, with the smart table 50 according to the present embodiment, the contents on the portable terminal device 7 are not directly displayed on the large screen, but only the icons for the contents are displayed. A user displays a content by selecting it, and thus much trouble is saved. The displayed content is switched by only selecting an icon, so that the trouble is saved. In addition, the operations are performed on the large screen, so that the contents can be selected with fewer errors.

Moreover, for example, when a plurality of people have a meeting, the smart table serving as a meeting table can be used as a shared screen. Specifically, with the smart table, a user can display information in the user's own portable terminal device 7 in front of the user's position, can copy a content allowed to be disclosed to another person's device, or can share the content for explanation.

While the smart table is illustrated as a large-screen terminal, the marker detection process, the icon display process, and the content display process described above can be performed on a large-screen touch panel display or a wall display mounted on a wall.

Distribution and Integration

The components of the apparatuses illustrated in the drawings need not be physically configured as illustrated. Specifically, specific forms of distribution and integration of the apparatuses are not limited to those illustrated in the drawings, but some or all of the components can be functionally or physically configured in a distributed or integrated manner in any units according to various load and use conditions. For example, the acquisition unit 11, the generation unit 12, the evaluation unit 13, the repetitive control unit 14, the replication unit 15, or the reconstruction unit 16 may be connected via a network as an external device of the image processing apparatus 10. Each of the acquisition unit 11, the generation unit 12, the evaluation unit 13, the repetitive control unit 14, the replication unit 15, and the reconstruction unit 16 may be included in another apparatus, and may cooperate via a network connection so as to implement the functions of the image processing apparatus described above.

Image Processing Program

The various processes described in the above embodiments can be performed by executing a prepared program on a computer, such as a personal computer or a workstation. Using FIG. 14, the following describes an example of a computer that executes an image processing program having the same functions as those of the embodiments described above.

Figure 14:
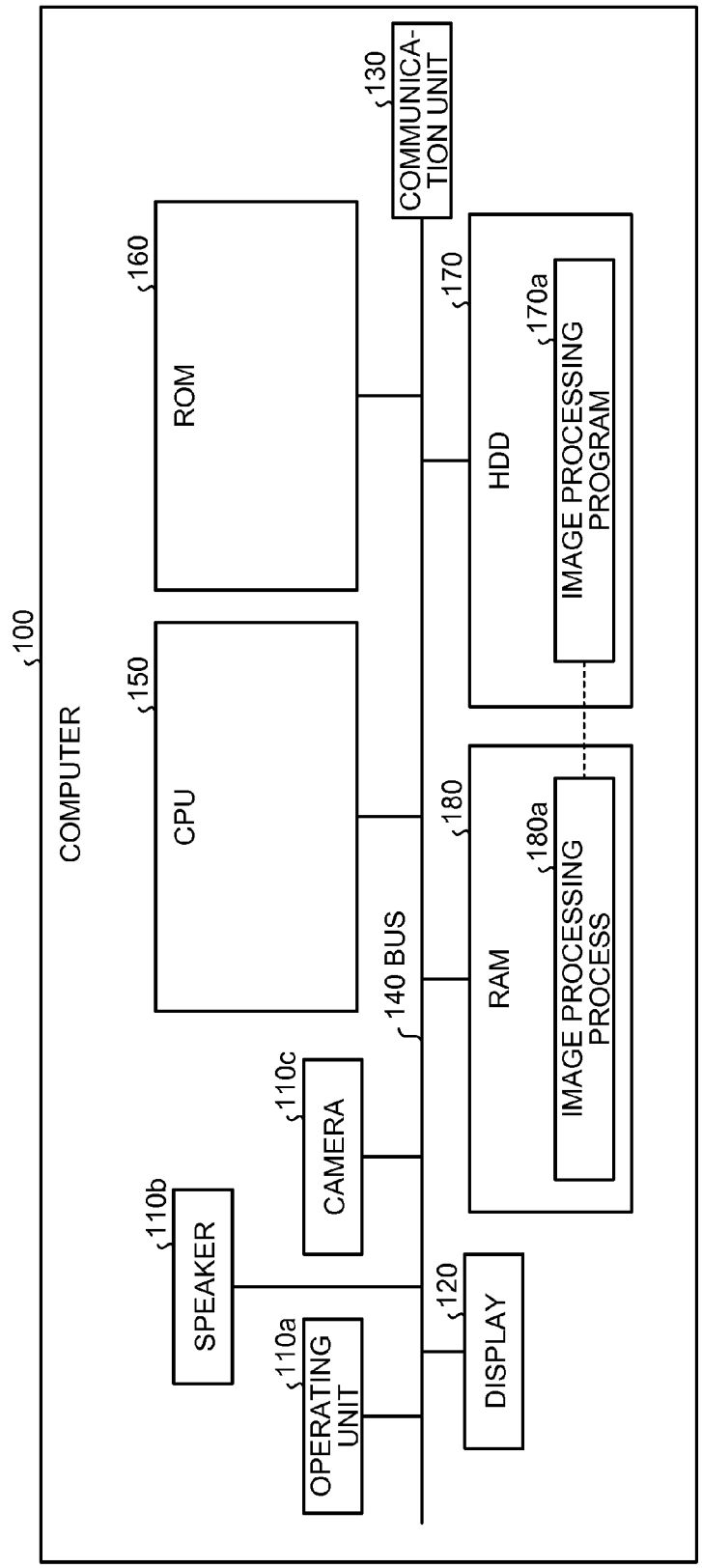
FIG. 14 is a diagram for explaining an example of a computer executing an image processing program according to the first and the second embodiments.

FIG. 14 is a diagram for explaining the example of the computer executing the image processing program according to the first and the second embodiments. As illustrated in FIG. 14, this computer 100 includes an operating unit 110a, a speaker 110b, a camera 110c, a display 120, and a communication unit 130. The computer 100 also includes a CPU 150, a read-only memory (ROM) 160, a hard disk drive (HDD) 170, and a random access memory (RAM) 180. The units 110 to 180 are connected to one another via a bus 140.

As illustrated in FIG. 14, the HDD 170 preliminarily stores therein an image processing program 170a that provides the same functions as those of the acquisition unit 11, the generation unit 12, the evaluation unit 13, the repetitive control unit 14, the replication unit 15, and the reconstruction unit 16 illustrated in the first embodiment described above. The image processing program 170a may be integrated or separated as appropriate in the same manner as the components, including the acquisition unit 11, the generation unit 12, the evaluation unit 13, the repetitive control unit 14, the replication unit 15, and the reconstruction unit 16 illustrated in FIG. 4. Specifically, the HDD 170 need not always store therein all data to be stored therein, but only needs to store therein data for processing.

The CPU 150 reads the image processing program 170a from the HDD 170, and loads the program into the RAM 180. This operation causes the image processing program 170a to serve as an image processing process 180a, as illustrated in FIG. 14. The image processing process 180a loads various types of data read from the HDD 170 into areas in the RAM 180 allocated to the data as appropriate, and executes various processing based on the various types of data thus loaded. The image processing process 180a includes processes performed in the acquisition unit 11, the generation unit 12, the evaluation unit 13, the repetitive control unit 14, the replication unit 15, and the reconstruction unit 16 illustrated in FIG. 4, such as the processes illustrated in FIGS. 10 and 12. All the processing units virtually implemented on the CPU 150 need not always operate on the CPU 150, but only a processing unit for processing need to be virtually implemented.

The image processing program 170a need not be stored in the HDD 170 or the ROM 160 from the start. For example, each program may be stored in a portable physical medium to be inserted into the computer 100, such as a flexible disk (also called FD), a compact disc read-only memory (CD-ROM), a DVD, a magneto-optical disk, or an integrated circuit card (ICC); and the computer 100 may obtain programs from such portable physical media, and execute the programs. The programs may be stored in another computer or a server device connected to the computer 100 via a public line, the Internet, a LAN, a wide area network (WAN), or the like, and the computer 100 may obtain the programs from such a computer or server device, and execute the programs.

A low-resolution marker can be detected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus comprising:
a processor that executes a process comprising:
acquiring an original image captured by a camera, the camera capturing a marker on which an ID is indicated by a color pattern which is formed by allocating a plurality of blocks to which any one of a plurality of display colors is respectively assigned for each of the plurality of blocks;
creating a plurality of color maps for each of the plurality of display colors by calculating a likelihood that each pixel in the original image has any one of the plurality of display colors;
generating a plurality of hypotheses, each of the plurality of hypotheses including a position, an attitude, and the ID of the marker that is assumed to exist in the original image;
first calculating evaluation values of the IDs of the plurality of hypotheses for each of the plurality of hypotheses based on a degree of similarity between each of the plurality of blocks and each of the plurality of color maps, the degree of similarity calculated for each block of the marker that is assumed to exist in the original image in accordance with the position and the attitude in the each of the plurality of hypotheses;
counting, for each ID of the marker, a number of the hypotheses in which the ID is assumed;
second calculating a variance value of the position or the attitude among the hypotheses having the ID of the marker with a maximum number of hypotheses;
replicating, when the variance value is a predetermined threshold or larger, the hypotheses based on the evaluation values calculated for each hypothesis;
changing IDs of the replicated hypotheses to IDs same as or different from the IDs of the replicated hypotheses in accordance with probabilities set based on a degree of similarity of color patterns between the IDs of the markers for each of the replicated hypotheses, to reconstruct the plurality of hypotheses generated at the generating; and
repeating the first calculating of the evaluation values, the counting of the number of the hypotheses, the second calculating of the variance value, the replicating of the hypotheses, and the reconstructing of the plurality of hypotheses until the variance value becomes smaller than the predetermined threshold, in the plurality of hypotheses reconstructed.

2. The image processing apparatus according to claim 1, wherein
the replicating includes replicating the hypotheses which become fewer when the evaluation values calculated for the each hypothesis are lower, or deleting the hypotheses when the evaluation values calculated for the each hypothesis are lower.

3. The image processing apparatus according to claim 1, wherein
the replicating includes replicating the hypotheses which become more when the evaluation values calculated for the each hypothesis are higher.

4. The apparatus for image processing according to claim 1, wherein the degree of similarity of color patterns between the IDs of the markers is calculated as a Hamming distance between the markers.

5. An image processing method comprising:
acquiring, using a processor, an original image captured by a camera, the camera capturing a marker on which an ID is indicated by a color pattern which is formed by allocating a plurality of blocks to which any one of a plurality of display colors is respectively assigned for each of the plurality of blocks;
creating, using the processor, a plurality of color maps for each of the plurality of display colors by calculating a likelihood that each pixel in the original image has any one of the plurality of display colors;
generating, using the processor, a plurality of hypotheses, each of the plurality of hypotheses including a position, an attitude, and the ID of the marker that is assumed to exist in the original image;
first calculating, using the processor, evaluation values of the IDs of the plurality of hypotheses for each of the plurality of hypotheses based on a degree of similarity between each of the plurality of blocks and each of the plurality of color maps, the degree of similarity calculated for each block of the marker that is assumed to exist in the original image in accordance with the position and the attitude in the each of the plurality of hypotheses;
counting, for each ID of the marker, a number of the hypotheses in which the ID is assumed, using the processor;
second calculating, using the processor, a variance value of the position or the attitude among the hypotheses having the ID of the marker with a maximum number of hypotheses;
replicating, using the processor, when the variance value is a predetermined threshold or larger, the hypotheses based on the evaluation values calculated for each hypothesis;
changing, using the processor, IDs of the replicated hypotheses to IDs same as or different from the IDs of the replicated hypotheses in accordance with probabilities set based on a degree of similarity of color patterns between the IDs of the markers for each of the replicated hypotheses, to reconstruct the plurality of hypotheses generated at the generating; and
repeating, using the processor, the first calculating of the evaluation values, the counting of the number of the hypotheses, the second calculating of the variance value, the replicating of the hypotheses, and the reconstructing of the plurality of hypotheses until the variance value becomes smaller than the predetermined threshold, in the plurality of hypotheses reconstructed.

6. A non-transitory computer readable recording medium having stored therein an image processing program causing a computer to execute a process comprising:

acquiring an original image captured by a camera, the camera capturing a marker on which an ID is indicated by a color pattern which is formed by allocating a plurality of blocks to which any one of a plurality of display colors is respectively assigned for each of the plurality of blocks;

creating a plurality of color maps for each of the plurality of display colors by calculating a likelihood that each pixel in the original image has any one of the plurality of display colors;

generating a plurality of hypotheses, each of the plurality of hypotheses including a position, an attitude, and the ID of the marker that is assumed to exist in the original image;

first calculating evaluation values of the IDs of the plurality of hypotheses for each of the plurality of hypotheses based on a degree of similarity between each of the plurality of blocks and each of the plurality of color maps, the degree of similarity calculated for each block of the marker that is assumed to exist in the original image in accordance with the position and the attitude in the each of the plurality of hypotheses;

counting, for each ID of the marker, a number of the hypotheses in which the ID is assumed;

second calculating a variance value of the position or the attitude among the hypotheses having the ID of the marker with a maximum number of hypotheses;

replicating, when the variance value is a predetermined threshold or larger, the hypotheses based on the evaluation values calculated for each hypothesis;

changing IDs of the replicated hypotheses to IDs same as or different from the IDs of the replicated hypotheses in accordance with probabilities set based on a degree of similarity of color patterns between the IDs of the markers for each of the replicated hypotheses, to reconstruct the plurality of hypotheses generated at the generating; and repeating the first calculating of the evaluation values, the counting of the number of the hypotheses, the second calculating of the variance value, the replicating of the hypotheses, and the reconstructing of the plurality of hypotheses until the variance value becomes smaller than the predetermined threshold, in the plurality of hypotheses reconstructed.

\* \* \* \* \*